United States Patent
Leibbrandt et al.

(10) Patent No.: US 8,235,865 B2
(45) Date of Patent: Aug. 7, 2012

(54) AUTOMATED TRANSMISSION AND METHOD OF CONTROLLING THE SAME

(75) Inventors: Martin Leibbrandt, Bedburg (DE); Ulrich Eggert, Viersen (DE)

(73) Assignee: Getrag Ford Transmissions GmbH, Cologne (DE)

(*) Notice: Subject to any disclaimer, the term of this patent is extended or adjusted under 35 U.S.C. 154(b) by 456 days.

(21) Appl. No.: 12/544,983

(22) Filed: Aug. 20, 2009

(65) Prior Publication Data
US 2010/0048354 A1    Feb. 25, 2010

(30) Foreign Application Priority Data
Aug. 25, 2008   (DE) .................. 10 2008 039 452

(51) Int. Cl.
   *B60W 10/00*   (2006.01)
   *F16H 59/00*   (2006.01)
   *B60K 28/12*   (2006.01)
(52) U.S. Cl. ............. 477/94; 477/901; 74/335; 180/282
(58) Field of Classification Search .................. 74/329, 74/330, 331, 335, 336 R, 340; 477/94, 901; 180/281, 282
See application file for complete search history.

(56) References Cited

U.S. PATENT DOCUMENTS

| | | | | |
|---|---|---|---|---|
| 3,684,049 A | * | 8/1972 | Kimura | 180/282 |
| 5,820,515 A | * | 10/1998 | Fukaya et al. | 477/92 |
| 6,675,668 B2 | * | 1/2004 | Schamscha | 74/340 |
| 7,810,626 B2 | * | 10/2010 | Schiele et al. | 192/219.4 |
| 2004/0060378 A1 | * | 4/2004 | Yamamoto et al. | 74/335 |
| 2005/0246081 A1 | * | 11/2005 | Bonnet et al. | 701/38 |

FOREIGN PATENT DOCUMENTS

| | | |
|---|---|---|
| DE | 101 09 662 | 9/2002 |
| EP | 1 681 497 | 7/2006 |
| JP | 2002295657 A | * 10/2002 |

* cited by examiner

*Primary Examiner* — Roger Pang
(74) *Attorney, Agent, or Firm* — Schlee IP International, P.C.; Alexander R. Schlee

(57) ABSTRACT

An automated gear shift transmission and method of controlling the same are described. The transmission is installed in a motor vehicle comprising several forward gears and at least one reverse gear and that allows choosing from several different driving modes by means of a driving mode selector lever. A forward gear is maintained in engagement in case of an uphill orientation of the motor vehicle when the parking mode is chosen. Instead of the forward gear, a reverse gear is maintained in engagement in case of a downhill orientation of the motor vehicle when the parking mode is chosen. This allows taking specific driving conditions or driving situations into account with relatively simple means.

18 Claims, 1 Drawing Sheet

Fig. 1
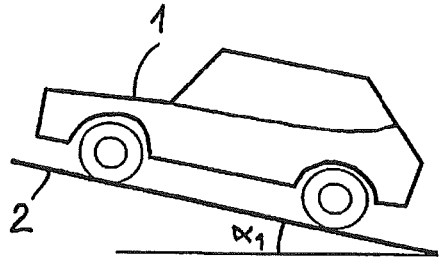
| P | G1 | G2 |
| R | G_reverse | G2 |
| N | G1 | G2 |
| D | G1 | G2 |
Fig. 2
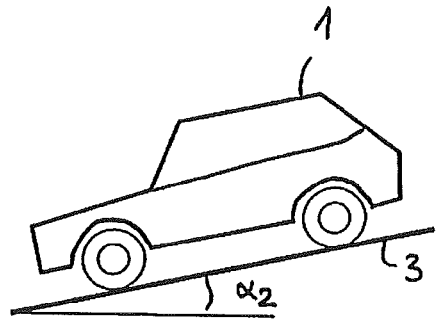
| P | G_reverse | G2 |
| R | G_reverse | G2 |
| N | G_reverse | G2 |
| D | G1 | G2 |
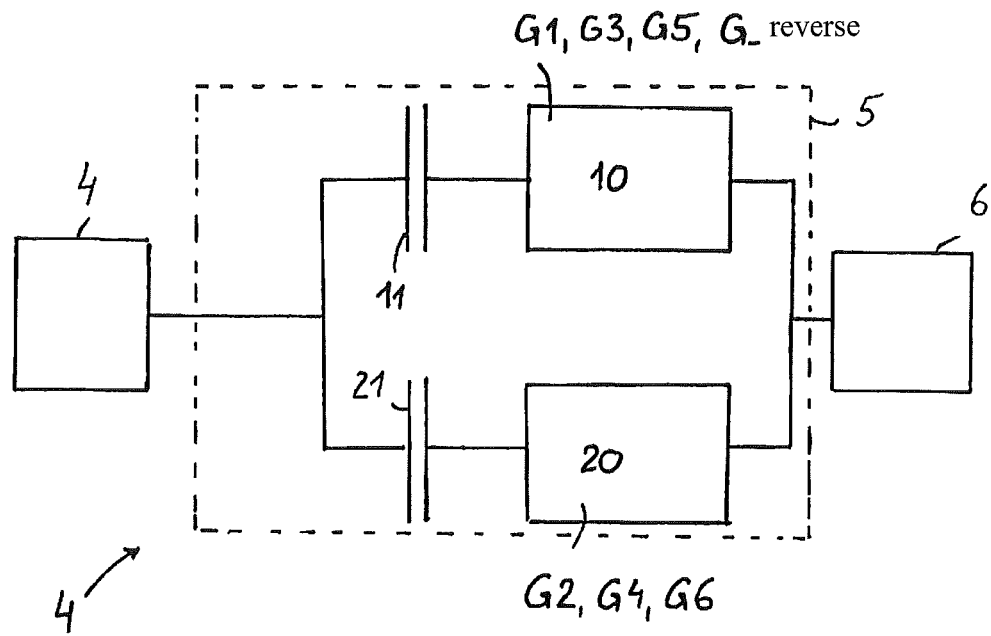
Fig. 3

AUTOMATED TRANSMISSION AND METHOD OF CONTROLLING THE SAME

CROSS REFERENCE TO RELATED APPLICATION

This application claims the priority right from the German patent application DE 102008039452.1 that was filed on Aug. 25, 2008, the content of which is herewith incorporated in its entirety by reference.

BACKGROUND OF THE INVENTION

The invention relates to a method of controlling an automated gear shift transmission that is installed in a motor vehicle, comprising several forward and at least one reverse gear and that allows choosing from several different driving modes by means of a driving mode selector lever.

From the DE 101 09 662 A1 a method of controlling the automated gear shift transmission designed as a dual clutch transmission is known, comprising a first partial gearbox having a first clutch and a first group of gears; and comprising a second partial gearbox having a second clutch and a second group of gears, wherein in a change-direction mode in that repeatedly a change of direction between the driving direction of the motor vehicle forward and reverse takes place, and wherein in one of the partial gearboxes a forward gear is kept permanently engaged and in the other partial gearbox comprising a reverse gear this reverse gear is kept permanently in engagement, and wherein a change of the driving directions is accomplished by alternatingly opening and closing the clutches in one of the gearboxes and closing or opening the clutches in the other partial gearbox, respectively. Such a change of direction of the motor vehicle is for instance helpful for routing into and out of parking spots and rocking the motor vehicle out of snow. Since due to the permanently engaged gears it is only necessary to activate the aforementioned clutches and not in addition the gear shift clutches allowing engaging and disengaging the particular gears, a change of the driving the direction can be accomplished quickly and with little wear. Therefore, this method of controlling the two dual clutch transmissions contributes to the driving comfort and to a long life cycle of the motor vehicle.

In the EP 1 681 497 A2 likewise a method of controlling a dual clutch transmission is described that enhances the driving comfort of the motor vehicle. According to this method, an undesired start-up creeping action of the motor vehicle in the case of lower temperatures should be eliminated.

The undesired start-up creeping action of the motor vehicle is attempted to be avoided in that in the dual clutch transmission in one of the partial gearboxes a forward gear and in the other gearbox a reverse gear are maintained in engagement while for the dual clutch transmission during the non-moving state the motor vehicle a non-driving mode (parking mode or idle driving mode) is chosen. By means of the engaged gears a creeping action of the motor vehicle is avoided since the drag torques occurring even with open clutches due to the high viscosity of the clutch fluid in case of low temperatures and these torques that at are transmitted by the clutches compensate each other to the extent that a creeping action is avoided.

For further or specific driving conditions of the motor vehicle, for instance in case of starting up at an uphill inclined road or downhill inclined road, a specific control of the dual clutch transmission is desirable. However, this requires a sensor or another previously performed method for determining these specific driving conditions. In case of a control during the start-up action of the motor vehicle at an uphill incline it would for instance be necessary to use an incline sensor or to analyze the vehicle acceleration while taking the driving resistance graph into consideration. A main problem for determining an uphill incline by means of a driving resistance graph is that the motor vehicle has to be in motion for this purpose. However, if the apparatus for controlling the dual clutch transmission is just starting up or the motor vehicle is not moving, no information can be acquired as to the inclination of the road, for instance for adjusting the start-up action on a hill. For this purpose, an inclination sensor has to be provided resulting, however, in additional costs.

SUMMARY OF THE INVENTION

It is therefore an object of the invention to create a method of controlling an automated gear shift transmission that can take specific driving conditions or driving situations into account but can be performed with relatively simple means.

The underlying object of the present invention is solved by a method of controlling an automated gear shift transmission installed in a motor vehicle comprising several forward gears and at least one reverse gear and that allows choosing from several different driving modes by means of a driving mode selector lever, comprising maintaining a forward gear in engagement in case of an uphill orientation of the motor vehicle, in the following referred to as uphill position, when the parking mode is chosen; and maintaining instead of the forward gear a reverse gear in engagement in case of a downhill orientation of the motor vehicle that is in the following referred to as the downhill position, when the parking mode is chosen. Accordingly, the automated gear shift transmission according to the present invention that is installed in a motor vehicle and adapted to perform the inventive control method comprises several forward gears; at least one reverse gear; a driving mode selector lever for choosing from several different driving modes; and a control apparatus for maintaining a forward gear in engagement in case of an uphill orientation of the motor vehicle, in the following referred to as uphill position, when the parking mode is chosen, and for maintaining instead of the forward gear a reverse gear in engagement in case of a downhill orientation of the motor vehicle that is in the following referred to as the downhill position, when at least one of a parking mode and idle driving mode is chosen.

When a motor vehicle is for instance parking in the uphill position, it can be concluded from the engaged forward gear in the parking mode that the motor vehicle is in the aforementioned uphill position. If in the parking mode the reverse gear is engaged, the motor vehicle is in the downhill position. By means of this information, also in case of a parked or non-moving motor vehicle a start-up action strategy specific for the inclination can be performed without needing an inclination sensor. An automated transmission can for instance be an automatic transmission shifting gears automatically, but can also be a semi-automatic transmission allowing to shift gears manually but without the need for the driver to actuate a clutch pedal. Further, the invention is applicable to sequential manual gearboxes.

According to a preferred embodiment, in an idle driving mode in case of the uphill position of the motor vehicle the forward gear is maintained in engagement, and in the downhill position of the motor vehicle, instead of the forward gear the reverse gear is maintained in engagement. If for instance starting from the idle driving mode a forward driving mode is chosen in the uphill position by the driver of the motor vehicle for starting up in an uphill and forward direction, the forward gear is already engaged so that only one clutch has to be closed for transmitting the torque from the motor of the vehicle to the driving wheels of the motor vehicle. Therefore, an undesired rollback action in case of starting on a hill in a forward direction can be reduced or entirely avoided.

If in contrast the motor vehicle is in its downhill position and the driver chooses starting from a parking mode or the idle driving mode in a reverse driving mode for starting the motor vehicle on the hill in a backwards direction, by means of the reverse gear that has already been engaged in the idle driving mode N or in the parking mode P and by means of further closing the clutch a torque can be transmitted quickly to the driving wheels. Also in this case the time can be minimized during which the motor vehicle is prone to rolling in an undesired direction due to the inclination of the road.

For providing a high start-up action comfort, i.e. a low startup-up rotational speed of the vehicle motor and a low wear of the clutch, i.e. a low rotational speed difference across the clutch, it is preferable that the engaged forward gear is the lowest of the forward gears. Accordingly, in the downhill position of the motor vehicle, the engaged reverse gear is preferably the lowest of several reverse gears in case several reverse gears are provided.

In the uphill position in the reverse driving mode the forward gear can be maintained in engagement as long as the main break of the motor vehicle is held in engagement. This avoids that, due to a slow transition from the parking mode to the forward driving mode that typically requires moving the selector lever through various positions passing through the reverse driving mode and then the idle driving mode, in the uphill position for a short period of time the forward gear is disengaged, resulting in a delayed starting of the motor vehicle in the forward driving mode.

The automated gear shift transmission is preferably a dual clutch transmission comprising a first partial gearbox, comprising a first clutch and a first group of gears, and a second partial gearbox, comprising a second clutch and a second group of gears, wherein the reverse gear and the lowest forward gear are comprised in the first partial gearbox. In this case, the first partial gearbox comprises the unevenly numbered forward gears (1st gear, 3rd gear, 5th gear and possibly further unevenly numbered gears), while the second partial transmission comprises the evenly numbered forward gears (2nd gear, 4th gear, 6th gear and possibly further evenly numbered gears). Therefore, also in case of a dual clutch transmission due to the engaged gear in the first partial transmission (either the lowest gear or the reverse gear) the position of the motor vehicle can be determined clearly.

According to a preferred embodiment, the second lowest forward gear that is comprised in the second gearbox is maintained in engagement in the uphill position and/or downhill position in the parking mode and in the idle driving mode. In the downhill position of the motor vehicle, the second lowest forward gear that has already been engaged in the parking mode or the idle driving mode can be used for the start-up action if the driver transitions quickly to the forward driving mode. It is noted that due to the orientation of the motor vehicle the gravity supports the start-up action.

In the downhill position in a forward driving mode the reverse gear can be maintained in engagement as long as the main brake of the motor vehicle is held in engagement. This measure facilitates in the downhill position of the motor vehicle a fast start-up action in a reverse direction when the driver shifts the selector lever from the forward driving mode into the reverse driving mode without losing any time during which the motor vehicle could roll in an undesired direction.

It is possible to determine whether the motor vehicle is in the uphill position or the downhill position by means of analyzing the vehicle acceleration under considering the driving resistance graph. In this case, limits can be applied for determining whether the motor torque vehicle is in its downhill position or in its uphill position. For instance, these limits for the downhill position and uphill position can be the same (for instance 5% uphill inclination or downhill inclination) but may also differ from each other (for instance 5% uphill inclination and 10% downhill inclination). If for the uphill inclination or the downhill inclination lower values are determined, neither the uphill position nor the downhill position applies. In this case, the motor vehicle is assumed to be in a non-inclined position.

In the non-inclined position of the motor vehicle in the idle driving mode the lowest forward gear and the second lowest forward gear can be maintained in engagement so that in case of a transition from the idle driving mode into the forward driving mode the two lowest gears are already engaged and therefore fast start-up action is possible. This pre-selection of the lowest forward gear and the second lowest forward gear can be performed depending on the most recent driving mode that was chosen. According to a preferred embodiment, the two first forward gears are kept in engagement during the idle driving mode if the previously selected driving mode was the reverse driving mode. This takes into consideration that the sequence of choices reverse driving mode—idle driving mode—reverse driving mode is more unlikely than the selection sequence reverse driving mode—idle driving mode—forward driving mode.

In the alternative or in addition in the non-inclined position of the motor vehicle in the idle driving mode the second lowest forward gear is maintained in engagement if the most recent driving mode that was chosen was the forward driving mode. This accomplishes that the second lowest forward gear keeps being engaged in case of a repeated transition from the reverse driving mode to the forward driving mode. Such a change can be observed in case of non-skilled drivers at traffic lights for avoiding a creeping action.

BRIEF DESCRIPTION OF THE DRAWINGS

The invention is explained in more detail with reference to the drawings.

In the drawings show:

FIG. 1 a motor vehicle in an uphill position demonstrating the gears that are engaged according to the invention in the various driving modes;

FIG. 2 the motor vehicle in a downhill position demonstrating the gears that are engaged according to the invention in the various driving modes;

FIG. 3 schematically the drive train of a motor vehicle

DETAILED DESCRIPTION OF THE DRAWINGS

FIG. 1 shows a motor vehicle that is directed in an uphill orientation. The motor vehicle 1 is therefore located on an upwardly sloped road that assumes in relation to the horizontal an angle of elevation $\alpha_1$. This upwardly oriented position of the motor vehicle according to FIG. 1 is referred to as the uphill position of the motor vehicle 1.

In FIG. 2, the motor vehicle is also shown, but here not on an uphill road, but on a road 3 that is directed downhill. The downhill road 3 comprises an angle of elevation $\alpha_2$ in relation to the horizontal. In the position of the motor vehicle 1 shown in FIG. 2 the motor vehicle 1 is in a downhill position, i.e. the front part of the motor vehicle is facing downhill.

FIG. 3 shows schematically a motor 4 and a dual clutch transmission 5 and a power output 6 of the motor vehicle 1. The dual clutch transmission is an automated gear shift transmission. The dual clutch transmission 5 comprises a first partial gearbox 10 and a second partial gearbox 20. The first partial gearbox 10 comprises a first clutch and three forward gears G1, G3, G5 as well as one reverse gear G_reverse. The second partial gearbox 20 comprises a second clutch 22 and three forward gears G2, G4, G6. The forward gear G1 is the lowest forward gear having the highest transmission ratio of the dual clutch transmission 5, while the highest forward gear, namely the forward gear G6, comprises the lowest transmission ratio. Therefore, the first partial transmission 10 comprises two start-up gears, namely the lowest or first gear GI as well as the reverse gear G_reverse.

By means of the dual clutch transmission the acceleration of the motor vehicle 1 is possible without any interruption in the driving power. During the start-up process of the motor vehicle 1, the lowest gear G1 is engaged so that when closing the first clutch 11 a torque is transmitted between the motor 4 and the power output 6 and therefore the driven wheels of the motor vehicle. During the acceleration of the motor vehicle in the first gear and even prior to the start-up process of the motor vehicle 1 the second forward gear G2 and therefore the second lowest gear that is accommodated in the partial gearbox 20 is engaged. For shifting from the first forward gear G1 to the second forward gear G2 during a transition phase the first clutch 11 is opened and the second clutch 21 is closed. In this transition phase torque is continuously transmitted between the motor 4 and the power output 6 resulting in acceleration without interruption in the driving power.

As already discussed above the method according to the invention for controlling of the dual clutch transmission 5 can be explained by referring to the tables shown in FIGS. 1 and 2. In the first column of the tables the various driving modes are listed that the driver of the motor vehicle can choose by means of a manual driving mode selector lever. The driving modes are in particular a parking mode P, a reverse driving mode R, an idle driving mode N and forward driving mode D. The driver chooses by means of choosing one of four positions of the driving mode selector lever one of the driving modes. The four positions of the driving mode selector lever are implemented in a curved slot along which the driving mode selector lever can be moved and are implemented in the same sequential order as the driving modes shown in the first column of the tables. If, for instance, the driver intends to change from the parking mode P to the forward driving mode D, he has to shift the driving mode selector lever from a position correlating to the parking mode P via the position correlating to the reverse driving mode R and the position correlating to the idle driving mode into the target position and therefore eventually choosing the forward driving mode D.

The second column of table 1 shows what gears are engaged in the first partial gearbox 10 of the dual clutch transmission 5 in case of an uphill position (see FIG. 1) during the start-up process. In the parking mode P the lowest forward gear G1 is engaged. Also in the idle mode position N the lowest forward gear G1 is engaged. For the reversed driving mode the reverse gear G_reverse is engaged, while in the forward driving mode likewise the first forward gear G1 is engaged.

If the motor vehicle 1 is in contrast in its downhill position (see FIG. 2) in the individual driving modes P, R, N and D the gears shown in the second column of the table according to FIG. 2 are engaged. For the parking mode P as well as for the idle driving mode N now the reverse gear G_reverse is maintained in engagement.

The method according to the invention comprises the advantage that due to the gears G1, G_reverse that are engaged in the parking mode P it is possible to determine whether the motor vehicle 1 is in an uphill position (FIG. 1) or in a downhill position (FIG. 2). When the motor vehicle is not moving or during starting of the control apparatus controlling the dual clutch transmission 5 it is possible to determine without any angle of inclination sensor the inclination (downhill incline or uphill incline) of the motor vehicle 1.

In the third column of the tables shown in the FIGS. 1 and 2 the gear is shown that is engaged in the various driving modes during of the start-up process in the second gearbox 20. In both cases, it is the second lowest or second forward gear G2.

If the motor torque vehicle 1 is for instance in an uphill position and the driver chooses to drive uphill and forward, the driver pushes the driving mode selector lever for this purpose into the position correlating to the forward driving mode D by passing the idle driving mode N or at least move the selector lever from this position. Since in this idle driving mode N the forward gear G1 is already engaged, for changing into the forward driving mode D the first clutch 11 (see FIG. 3) can be held closed without requiring actuation of any gear shift clutch in the first partial gearbox. This results in transmitting of the torque from the motor 4 immediately to the power output 6 so that an undesired rollback action during the start-up process on the hill is avoided.

For the downhill position (FIG. 2) the method according to the invention provides in the driving modes P, N an engagement of the reverse gear G_reverse. If the driver does now choose the reverse driving mode R by means of the driving mode selector lever, this happens from the parking mode P or from the idle driving mode N or via these driving modes. Due to the engaged reverse gear G_reverse in the driving modes P, N after reaching the position of the selector lever correlating to the reverse driving mode R the first clutch 11 is closed immediately so that the motor vehicle 1 does not roll downhill prior to as chosen drive uphill and backwards.

Lists of Component Parts
1 motor vehicle
2 uphill road
3 downhill road
4 motor
5 dual clutch transmission
6 power output
10 first partial gearbox
11 first clutch
22 second partial gearbox
21 second clutch

What is claimed is:
1. A method of controlling an automated gear shift transmission installed in a motor vehicle comprising several forward gears and at least one reverse gear and that allows choosing from several different driving modes (P, R, N, D) by means of a driving mode selector lever, comprising:
maintaining a forward gear in engagement in case of an uphill orientation of the motor vehicle, in the following referred to as uphill position, when a parking mode (P) is chosen;
maintaining instead of the forward gear a reverse gear in engagement in case of a downhill orientation of the motor vehicle that is in the following referred to as the downhill position, when the parking mode (P) is chosen;
maintaining the forward gear in engagement in case of the uphill position of the motor vehicle when an idle driving mode (N) is chosen; and maintaining instead of the forward gear the reverse gear in engagement in the downhill position of the motor vehicle when the idle driving mode (N) is chosen.

2. The method according to claim 1, further comprising choosing such forward gear of the several forward gears that has a highest transmission ratio and is therefore the lowest forward gear.

3. The method according to claim 1, further comprising choosing such forward gear to be maintained in engagement of the several forward gears that has a highest transmission ratio and is therefore the lowest forward gear.

4. The method according to claim 1, further comprising choosing such reverse gear to be maintained in engagement that is the lowest of several reverse gears in case several reverse gears are provided.

5. The method according to claim 1, further comprising maintaining the forward gear in engagement as long as a main brake of the motor vehicle is held in engagement when the vehicle is in the uphill position in the reverse driving mode (R).

6. The method according to claim 1, further comprising implementing said method in a dual clutch transmission comprising a first partial gearbox comprising a first clutch and a first group of gears, and a second partial gearbox, comprising a second clutch and a second group of gears, wherein the reverse gear and the lowest forward gear are comprised in the first partial gearbox.

7. The method according to claim 6, further comprising maintaining the second lowest forward gear that is comprised in the second gearbox in engagement in at least one of the uphill position and downhill position in the parking mode (P) and in an idle driving mode (N).

8. The method according to claim 6, further comprising maintaining the reverse gear in engagement in the downhill position in a forward driving mode (D) as long as a main brake of the motor vehicle is held in engagement.

9. The method according to claim 6, further comprising maintaining the lowest forward gear and the second lowest forward gear in engagement in a non-inclined position of the motor vehicle in an idle driving mode (N).

10. The method according to claim 6, further comprising maintaining the lowest forward gear and the second lowest forward gear in engagement in a non-inclined position of the motor torque vehicle in an idle driving mode (N) if the most recent driving mode that was chosen was a reverse driving mode (R).

11. The method according to claim 9, further comprising maintaining the second lowest forward gear in engagement in a non-inclined position of the motor torque vehicle in the idle driving mode (N) if the most recent driving mode that was chosen was a forward driving mode (D).

12. An automated dual clutch gear shift transmission adapted to be installed in a motor vehicle, said automated dual clutch gear shift transmission comprising:
  a first partial gearbox with a first clutch and a first group of gears including a reverse gear and the a lowest forward gear;
  a second partial gearbox with a second clutch and a second group of gears;
  several forward gears in the first and the second partial gearbox;
  a driving mode selector lever for choosing from several different driving modes (P, R, N, D); and
  a control apparatus for maintaining a forward gear in engagement in case of an uphill orientation of the motor vehicle, in the following referred to as uphill position, when a parking mode (P) is chosen, and for maintaining instead of the forward gear a reverse gear in engagement in case of a downhill orientation of the motor vehicle that is in the following referred to as the downhill position, when at least one of the parking mode (P) and an idle driving mode (N) is chosen.

13. The automated gear shift transmission according to claim 12, wherein forward gear that is maintained in engagement is the forward gear that has a highest transmission ratio and is therefore the lowest forward gear; and the
  reverse gear that is maintained in engagement is the is the reverse gear that has a highest transmission ratio and is therefore lowest of several reverse gears in case several reverse gears are provided.

14. The automated gear shift transmission according to claim 12, comprising means for maintaining the forward gear in engagement as long as a main brake of the motor vehicle is held in engagement when the vehicle is in the uphill position in a reverse driving mode (R).

15. The automated gear shift transmission according to claim 12, comprising means for maintaining the second lowest forward gear that is comprised in the second gearbox in engagement in at least one of the uphill position and downhill position in the parking mode (P) and in the idle driving mode (N).

16. The automated gear shift transmission according to claim 12, comprising means for maintaining the reverse gear in engagement in the downhill position in a forward driving mode (D) as long as a main brake of the motor vehicle is held in engagement.

17. The automated gear shift transmission according to claim 12, comprising means for maintaining the lowest forward gear and the second lowest forward gear in engagement in a non-inclined position of the motor vehicle in the idle driving mode (N) if the most recent driving mode that was chosen was a reverse driving mode (R).

18. The automated gear shift transmission according to claim 12, comprising means for maintaining the second lowest forward gear in engagement in a non-inclined position of the motor torque vehicle in the idle driving mode (N) if the most recent driving mode that was chosen was a forward driving mode (D).

* * * * *